United States Patent
Nickel et al.

(10) Patent No.: US 11,022,684 B2
(45) Date of Patent: Jun. 1, 2021

(54) ALERT ZONES FOR A MARINE ENVIRONMENT

(71) Applicant: NAVICO HOLDING AS, Egersund (NO)

(72) Inventors: Frank S. Nickel, Edmond, OK (US); Alan Proctor, Owasso, OK (US); Tracy Brown, Jr., Tulsa, OK (US)

(73) Assignee: NAVICO HOLDING AS, Egersund (NO)

( * ) Notice: Subject to any disclaimer, the term of this patent is extended or adjusted under 35 U.S.C. 154(b) by 505 days.

(21) Appl. No.: 16/121,976

(22) Filed: Sep. 5, 2018

(65) Prior Publication Data

US 2019/0004164 A1 Jan. 3, 2019

Related U.S. Application Data

(63) Continuation of application No. 14/852,140, filed on Sep. 11, 2015, now Pat. No. 10,094,918.

(60) Provisional application No. 62/050,123, filed on Sep. 13, 2014.

(51) Int. Cl.
*G01S 7/62* (2006.01)
*G01S 15/93* (2020.01)
*G01S 15/96* (2006.01)

(52) U.S. Cl.
CPC ............ *G01S 7/6272* (2013.01); *G01S 15/93* (2013.01); *G01S 15/96* (2013.01)

(58) Field of Classification Search
CPC ......... G01S 7/6272; G01S 15/96; G01S 15/93
See application file for complete search history.

(56) References Cited

U.S. PATENT DOCUMENTS

| | | | |
|---|---|---|---|
| 5,031,157 | A | 7/1991 | Anderson et al. |
| 5,303,204 | A | 4/1994 | Wertsberger |
| 5,309,408 | A | 5/1994 | Bick et al. |
| 5,400,300 | A | 3/1995 | Bick et al. |
| 5,675,552 | A | 10/1997 | Hicks et al. |
| 6,995,527 | B2 | 8/2006 | DePasqua |
| 7,355,924 | B2 | 4/2008 | Zimmerman et al. |
| 8,305,844 | B2 | 11/2012 | DePasqua |
| 8,879,359 | B2 | 11/2014 | DePasqua |
| 10,094,918 | B2 * | 10/2018 | Nickel .................. G01S 15/93 |
| 2003/0112171 | A1 | 6/2003 | Michaelson et al. |

(Continued)

*Primary Examiner* — Daniel Pihulic
(74) *Attorney, Agent, or Firm* — Nelson Mullins Riley & Scarborough LLP

(57) ABSTRACT

Various implementations directed to alert zones for a marine environment. In one implementation, a marine electronics device may include a memory having a plurality of program instructions which, when executed by the sonar signal processor, cause the processor to determine one or more alert zones for a marine environment proximate to a vessel, and to receive sonar data from a transducer array disposed on the vessel, where the sonar data corresponds to the marine environment. The memory may further have program instructions which, when executed by the sonar signal processor, cause the processor to analyze the received sonar data to determine a depth line, where the depth line is a representation of one or more depths of an underwater floor of the marine environment, and to provide one or more alerts if at least a portion of the depth line is positioned within the one or more alert zones.

20 Claims, 14 Drawing Sheets

(56) References Cited

U.S. PATENT DOCUMENTS

| | | |
|---|---|---|
| 2005/0099887 A1 | 5/2005 | Zimmerman et al. |
| 2007/0025183 A1 | 2/2007 | Zimmerman et al. |
| 2015/0097838 A1 | 4/2015 | Steward |
| 2016/0011310 A1 | 1/2016 | Horner et al. |
| 2016/0077199 A1* | 3/2016 | Nickel .................. G01S 7/6272 367/107 |
| 2016/0377716 A1 | 12/2016 | Proctor et al. |
| 2019/0004164 A1* | 1/2019 | Nickel .................... G01S 15/96 |

* cited by examiner

ALERT ZONES FOR A MARINE ENVIRONMENT

CROSS-REFERENCE TO RELATED APPLICATIONS

This application is a continuation of and claims priority to U.S. application Ser. No. 14/852,140, entitled "Alert Zones for a Marine Environment", filed Sep. 11, 2015, which claims the benefit of U.S. Provisional Patent Application Ser. No. 62/050,123, entitled "Marine Navigation Using Alert Zones", filed Sep. 13, 2014, each of which is hereby incorporated by reference in its entirety.

BACKGROUND OF THE INVENTION

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Sonar data may be used to detect waterborne and/or underwater objects. In particular, when analyzed, sonar data may be used to determine depths of a marine environment, detect fish or other waterborne objects, locate wreckage, and/or the like. An operator of a vessel may use such sonar data to assist with the navigation of the vessel and/or to perform other functions.

BRIEF SUMMARY OF THE INVENTION

Described herein are implementations of various technologies relating to alert zones for a marine environment. In one implementation, a marine electronics device may include a sonar signal processor and a memory having a plurality of program instructions which, when executed by the sonar signal processor, cause the processor to determine one or more alert zones for a marine environment proximate to a vessel. The memory may also have program instructions which, when executed by the sonar signal processor, cause the processor to receive sonar data from a transducer array disposed on the vessel, where the sonar data corresponds to the marine environment. The memory may further have program instructions which, when executed by the sonar signal processor, cause the processor to analyze the received sonar data to determine a depth line, where the depth line is a representation of one or more depths of an underwater floor of the marine environment. The memory may additionally have program instructions which, when executed by the sonar signal processor, cause the processor to provide one or more alerts if at least a portion of the depth line is positioned within the one or more alert zones.

In another implementation, a sonar system disposed on a vessel may include a transducer array configured to receive one or more sonar return signals and to convert the one or more sonar return signals into sonar data, and may include a marine electronics device. The marine electronics device may include a sonar signal processor and a memory having a plurality of program instructions which, when executed by the sonar signal processor, cause the processor to determine one or more alert zones for a marine environment proximate to a vessel. The memory may also have program instructions which, when executed by the sonar signal processor, cause the processor to receive sonar data from a transducer array disposed on the vessel, where the sonar data corresponds to the marine environment. The memory may further have program instructions which, when executed by the sonar signal processor, cause the processor to analyze the received sonar data to determine a depth line, where the depth line is a representation of one or more depths of an underwater floor of the marine environment. The memory may additionally have program instructions which, when executed by the sonar signal processor, cause the processor to provide one or more alerts if at least a portion of the depth line is positioned within the one or more alert zones.

In yet another implementation, a non-transitory computer-readable medium may have stored thereon computer-executable instructions which, when executed by a computer, cause the computer to determine one or more alert zones for a marine environment proximate to a vessel. The computer-executable instructions may also cause the computer to receive sonar data from a transducer array disposed on the vessel, where the sonar data corresponds to the marine environment. The computer-executable instructions may further cause the computer to analyze the received sonar data to determine a depth line, where the depth line is a representation of one or more depths of an underwater floor of the marine environment. The computer-executable instructions may additionally cause the computer to provide one or more alerts if at least a portion of the depth line is positioned within the one or more alert zones.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
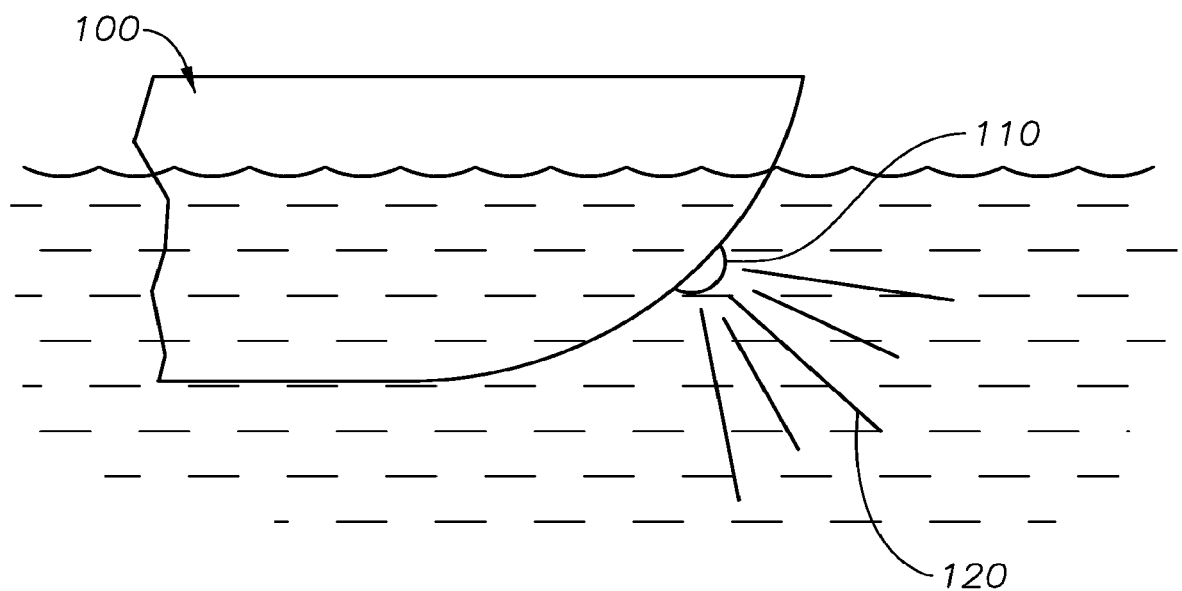
FIG. 1 illustrates a vessel having a transducer array disposed thereon in accordance with implementations of various techniques described herein.

Various implementations directed to alert zones for a marine environment will now be described in the following paragraphs with reference to FIGS. 1-12.

Sonar System

In one implementation, a vessel configured to traverse a marine environment may use a sonar system disposed on and/or proximate to the vessel. The vessel may be a surface water vehicle, a submersible water vehicle, or any other implementation known to those skilled in the art. The sonar system, in particular, may be used to acquire sonar data corresponding to an area of water proximate to the vessel, including areas to the side of, behind, below, and/or to the front of the vessel. Such sonar data may be used to identify objects in the area of water. In one implementation, a sonar system may include a sonar transducer array and one or more marine electronics devices.

Sonar Transducer Array

The sonar transducer array may be composed of one or more transducer elements, where at least one transducer element is configured to produce one or more sound pressure signals (i.e., one or more sonar output signals). In one implementation, the transducer array may receive one or more transmit signals from a marine electronics device (as further described below), and, in response, produce the one or more sonar output signals.

The transducer array may emit sonar output signals in a downward direction away from the vessel and into the area of water proximate to the vessel. Based on the transducer array's position with respect to the vessel and/or the arrangement of the transducer elements within the array itself, the sonar output signals may be emitted from one or more sides of the vessel, such as in front of the vessel. Properties of the sonar output signals generated by the transducer elements may be determined by an area and shape of the transducer elements, the sound wave frequency of the transducer elements, the sound velocity of the propagation medium (e.g., a body of water), and/or the like.

Reflected sonar output signals may be received by one or more of the transducer elements of the array in the form of one or more sonar return signals. A sonar return signal may represent an echo return that has reflected from a surface of an object in the area of water proximate to the vessel. In one implementation, an object may be a point on an underwater floor, a portion of a fish, a piece of debris, and/or any other waterborne object known to those skilled in the art. In turn, the transducer array may convert the sonar return signals into sonar data to be sent to the one or more marine electronics devices for processing (as further described below). The sonar data may be in form of electrical signals (e.g., analog or digital signals) that are representative of the sonar return signals.

The transducer array may be positioned at one or more locations that are on and/or proximate to the vessel, such as in one or more housings that are flexibly mounted to a hull of the vessel. In a further implementation, the transducer array may be mounted to the hull of the vessel such that the array is submerged in the water proximate to the vessel.

For example, FIG. 1 illustrates a vessel 100 having a transducer array 110 disposed thereon in accordance with implementations of various techniques described herein. In particular, the transducer array 110 may be coupled to a hull of the vessel 100, such that the transducer array 110 may be configured to downwardly emit one or more sonar output signals 120 in an area of water in front of the vessel 100. In such an example, the transducer array 110 may also be positioned to acquire sonar data from this area of water (i.e., in the direction of travel of the vessel 100). This sonar data may then be sent to one or more marine electronics devices (not shown) for processing, such that one or more objects in the water in front of the vessel 100 may be identified, as further described below.

Marine Electronics Device

As noted above, the transducer array may transmit sonar data that is representative of the sonar return signals to one or more marine electronics devices. The one or more marine electronics devices may be configured to process the sonar data, as further described below.

The one or more marine electronics devices may include a sonar module (e.g., a fish finder sonar module), a multi-function display (MFD) device, a smart phone, and/or any other implementation used for processing sonar data known to those skilled in the art. In one such implementation, the sonar module may receive the sonar data from the transducer array, and then conduct one or more processing steps on the sonar data before transmitting the sonar data to another device, such as an MFD device, for display. In another implementation, the transducer array and the one or more marine electronics devices may be positioned at one or more locations on and/or proximate to a vessel.

As mentioned above, the one or more marine electronics devices may be configured to process the sonar data received from a transducer array. In one implementation, and as further described below, the marine electronics devices may perform such processing to determine locations of one or more objects with respect to the vessel within the marine environment, which can be used to generate a number of different images that portray information regarding the marine environment. In a further implementation, the marine electronics devices may perform interferometric processing on the sonar data, as is known to those skilled in the art.

Figure 2:
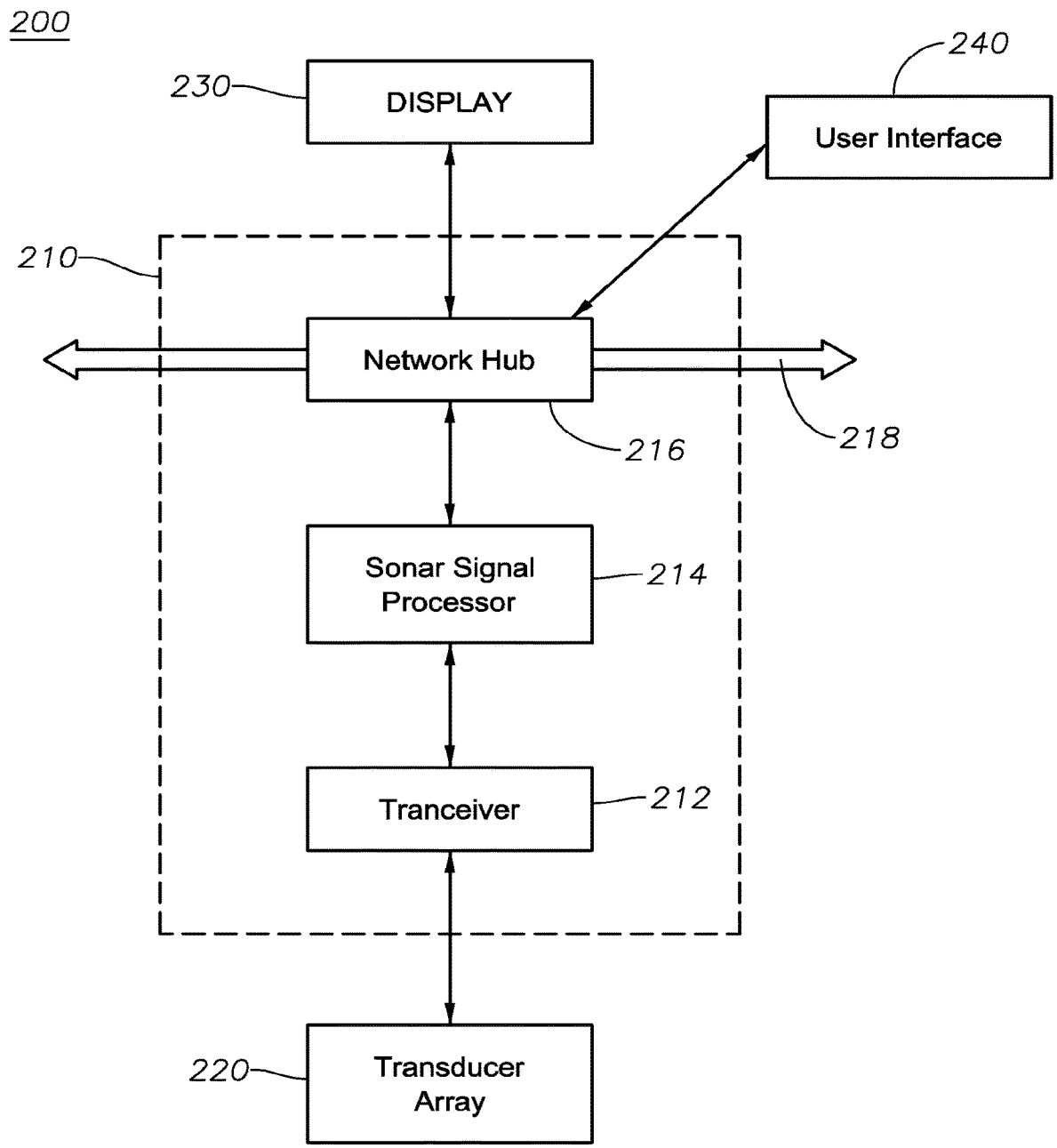
FIG. 2 illustrates a block diagram of a sonar system which includes a sonar module in accordance with implementations of various techniques described herein.

One implementation of a sonar system as discussed above is shown in FIG. 2. FIG. 2 illustrates a block diagram of a sonar system 200 which includes a sonar module 210 in accordance with implementations of various techniques described herein. The sonar system 200 may include various components, which may include means embodied in hardware and/or software configured to perform one or more corresponding functions. For example, in addition to the sonar module 210, the sonar system 200 may include a transducer array 220, a display element 230, and a user interface 240. Further, the sonar module 210 may include a transceiver 212, a sonar signal processor 214, and a network hub 216. One or more other components and/or peripheral devices known to those skilled in the art may be included in the sonar system 200.

As noted above, the transducer array 220 may transmit sonar data to the sonar module 210 for further processing. In particular, the transceiver 212 may receive the sonar data from the transducer array 220, and then transmit the received sonar data to the sonar signal processor 214 to carry out the processing. The sonar signal processor 214 may determine locations of one or more objects with respect to the vessel within the marine environment, and then render a number of different images that portray information regarding the marine environment. Using the network hub 216, those images may be transmitted to the display element 230 for display to a user.

Similar components of the sonar module 210 may be used in other marine electronics devices, such as in a multi-function display (MFD) device, a smart phone, and/or the like. Further implementations of the sonar system 200 and the sonar module 210 are discussed in greater detail below.

Sonar Data Processing

As noted above, an operator of a vessel may use sonar data to assist with the navigation of a vessel in a marine environment (i.e., an area of water). For example, the sonar data, when analyzed by one or more marine electronics devices, may be used to determine locations of objects within the marine environment, which, in turn, may be used to determine depths of an underwater floor, detect the presence of fish or other waterborne objects, and/or the like. The underwater floor may include a bottom floor of the marine environment, underwater structures disposed on the bottom floor, and/or the like.

In one implementation, a transducer array of a sonar system, such as those described above, may be used to acquire sonar data corresponding to a marine environment proximate to a vessel. This sonar data may be analyzed by one or more marine electronics devices of the sonar system, such that objects in the water proximate to the vessel may be identified. In one implementation, a depth line may be identified based on the analyzed sonar data. The depth line may be a representation of the depths of the surface of the underwater floor in the marine environment proximate to the vessel.

Alert Zones

In a further implementation, one or more alert zones may be used by the one or more marine electronics devices to notify the operator of the depth line. An alert zone may represent an imaginary area within the marine environment, where the alert zone may have a defined boundary. For example, an alert zone may represent an imaginary area in the water proximate to the vessel that is defined by a specific distance in front of and a specific distance below the vessel. If the one or more marine electronics devices determine that at least a portion of the depth line is positioned within this imaginary area, then an alert may be provided to the operator. These alerts may be used to avoid collisions with the underwater floor.

In another implementation, the one or more marine electronics devices may establish multiple alert zones for the marine environment, where the zones may represent different areas of water proximate to the vessel. In such an implementation, the one or more marine electronics devices may establish a critical zone, a warning zone, and/or a safe zone for the marine environment. In a further implementation, the one or more marine electronics devices may establish the multiple alert zones based on user inputs, which may be provided via a user interface of the one or more marine electronics device (e.g., user interface 240 of FIG. 2).

Critical Zone

The critical zone may have the smallest area of the alert zones, and may be the zone that is most immediately proximate to the vessel. Further, portions of the depth line positioned within the critical zone may represent parts of the underwater floor that are more likely to collide with the vessel when compared to portions of the depth line positioned outside of the critical zone.

In one implementation, the critical zone may be a substantially rectangular area in front of and below the vessel. In such an implementation, the critical zone may have a boundary that is defined by a critical forward range and a critical depth. The critical forward range may be a defined range in front of the vessel, and the critical depth may be a defined depth below the vessel. In a further implementation, values for the critical forward range and the critical depth may be provided to the one or more marine electronics devices via user input. The user input may be provided via a user interface of the one or more marine electronics device (e.g., user interface 240 of FIG. 2).

Figure 3A:
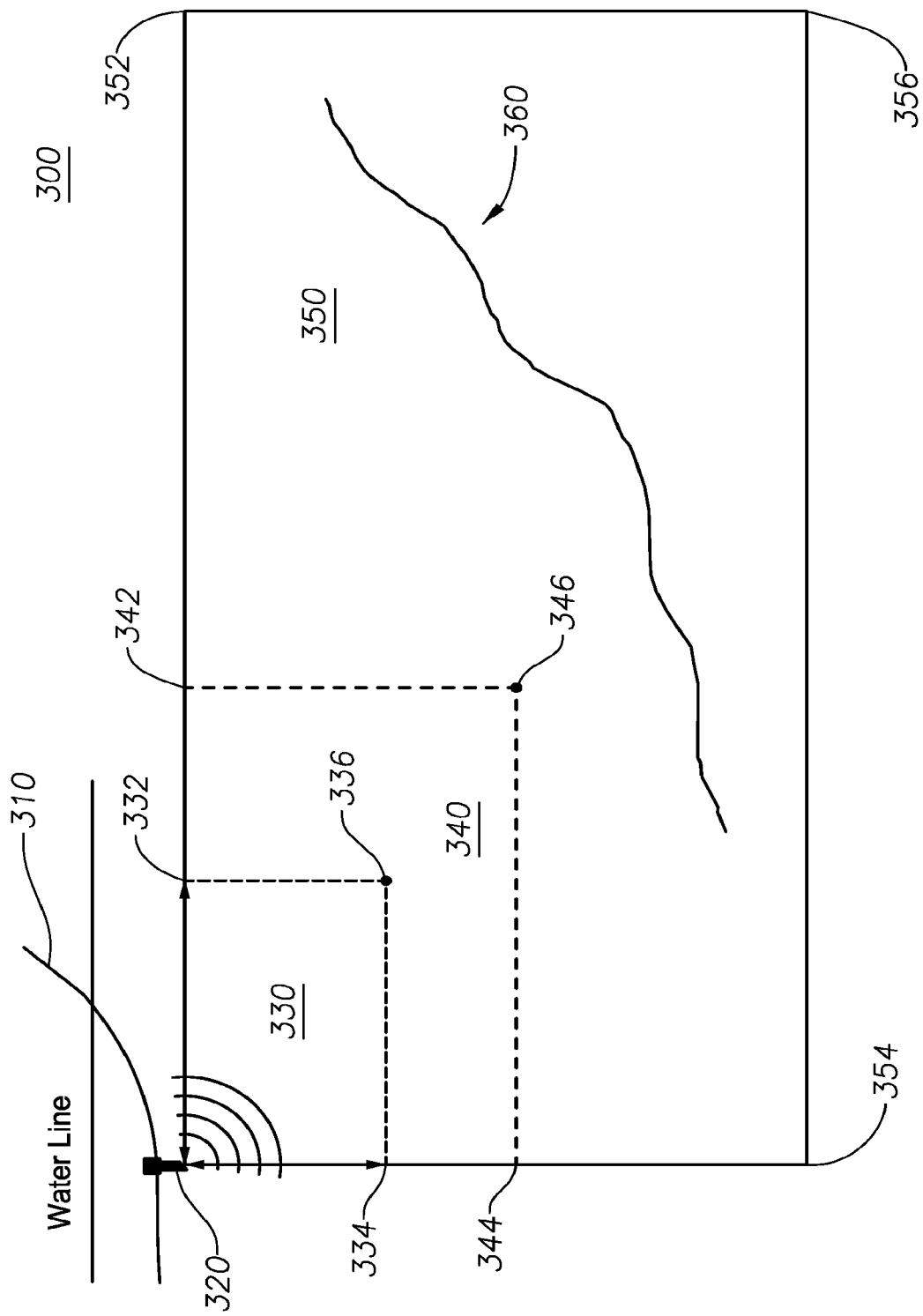
FIGS. 3A-3C illustrates schematic diagrams of a marine environment in accordance with implementations of various techniques described herein.
Figure 3B:
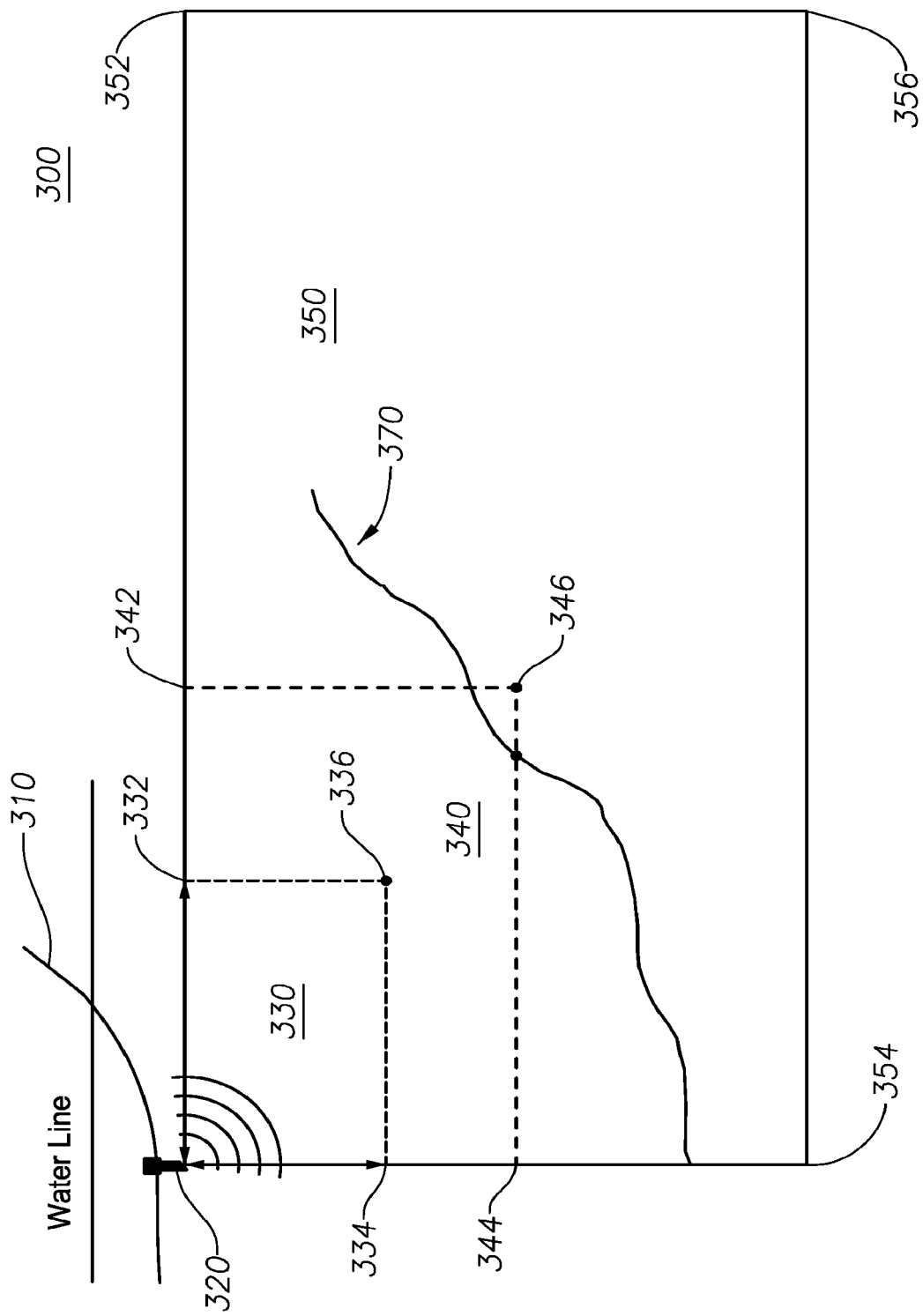
Figure 3C:
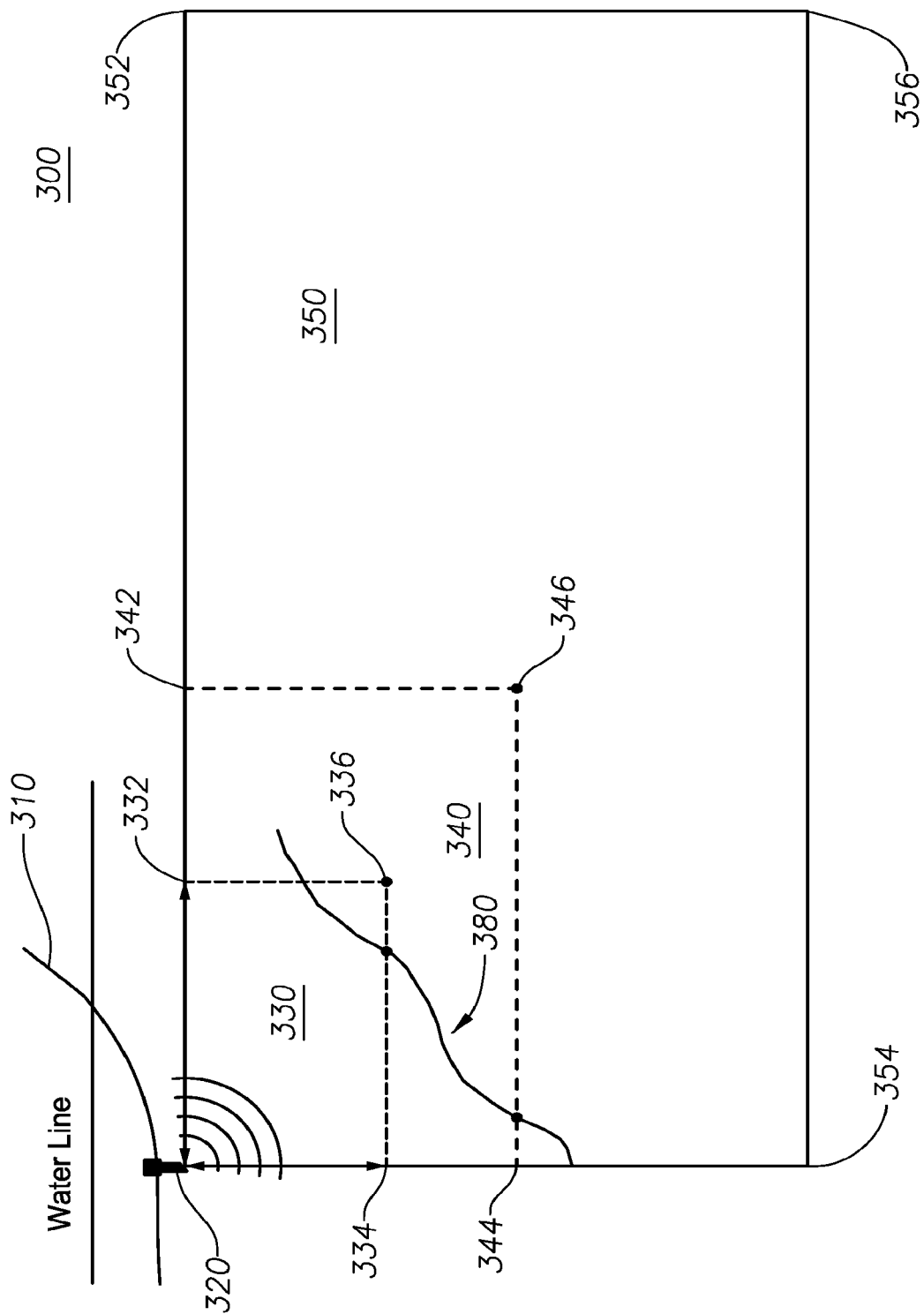

For example, FIGS. 3A-3C illustrate schematic diagrams of a marine environment 300 in accordance with implementations of various techniques described herein, where the marine environment 300 includes a critical zone 330. As shown, a vessel 310 with a transducer array 320 may be positioned within the marine environment 300. In one implementation, the transducer array 320 may be mounted to the hull of the vessel 310. The vessel 310 and the transducer array 320 may be similar to those discussed above with respect to FIGS. 1-2.

As is also shown, the critical zone 330 may be a substantially rectangular area proximate to the vessel 310, where the critical zone 330 is determined using a critical forward range 332 and a critical depth 334. In particular, one side of the critical zone 330 may be an imaginary straight line extending from the vessel 310 (e.g., at the transducer array 320) to a point representing the critical forward range 332. Similarly, another side of the critical zone 330 may be an imaginary straight line extending from the vessel 310 (e.g., at the transducer array 320) to a point representing the critical depth 334. The remaining sides of the critical zone 330 may be formed by imaginary straight lines that extend from the points representing the critical forward range 332 and the critical depth 334, where the lines meet at a critical range point 336. The critical range point 336 may be a point in the marine environment 300 that has a horizontal offset from the vessel 310 that is equal to the critical forward range 332, and a vertical offset from the vessel 310 that is equal to the critical depth 334.

Warning Zone

The warning zone may be an alert zone that represents an imaginary area of the marine environment that is outside of the critical zone. The warning zone may cover a larger area than the critical zone. As noted above, portions of the depth line that lie within the warning zone, but outside of the critical zone, may represent parts of the underwater floor that are less likely to collide with the vessel than those portions positioned within the critical zone. However, portions of the depth line that lie within the warning zone may be more likely to collide with the vessel than those portions that are positioned outside of the warning zone.

In one implementation, the warning zone may be a substantially rectangular area in front of and below the vessel. In such an implementation, the warning zone may have a boundary that is defined by a warning forward range and a warning depth. The warning forward range may be a defined range in front of the vessel, and the warning depth may be a defined depth below the vessel. In a further implementation, the warning forward range may be derived by multiplying the value of the critical forward range by a predetermined ratio. For example, the warning forward range may be determined by multiplying the value of the critical forward range by 1.618. The warning depth may be similarly derived by multiplying the value of the critical forward range by a predetermined ratio, where the predetermined ratio may be the same as the ratio used for the warning forward range.

For example, as illustrated in FIGS. 3A-3C, the marine environment 300 may also include a warning zone 340. As shown, the warning zone 340 may be a substantially rectangular area determined using a warning forward range 342 and a warning depth 344. In particular, one side of the warning zone 340 may be an imaginary straight line extending from the vessel 310 (e.g., at the transducer array 320) to a point representing the warning forward range 342. Similarly, another side of the warning zone 340 may be an imaginary straight line extending from the vessel 310 (e.g., at the transducer array 320) to a point representing the warning depth 344. The remaining sides of the warning zone 340 may be formed by imaginary straight lines that extend from the points representing the warning forward range 342 and the warning depth 344, where the lines meet at point 346.

Safe Zone

Yet another alert zone may include a safe zone, which may be defined as an imaginary area of the marine environment that is outside of the warning zone. The safe zone may cover a larger area than the warning zone. As noted above, portions of the depth line that lie within the safe zone, but outside of the critical and/or warning zones, may represent parts of the underwater floor that may be less likely to collide with the vessel when compared to portions of the depth line that are positioned within the critical and/or warning zones.

In one implementation, the safe zone may be a substantially rectangular area in front of and below the vessel. In such an implementation, the safe zone may have a boundary that is defined by a screen forward range and a screen depth. The screen forward range and screen depth may each be defined as the range and depth of the marine environment proximate to the vessel (e.g., in front of and below the vessel) that may be displayed by the one or more marine electronics devices (e.g., via a display element 230 of FIG. 2). In a further implementation, values for the screen forward range and/or screen depth may be provided to the one or more marine electronics devices via user input, which may be provided via a user interface of the one or more marine electronics device (e.g., user interface 240 of FIG. 2).

For example, as illustrated in FIGS. 3A-3C, the marine environment 300 may also include a safe zone 350. As shown, the safe zone 350 may be a substantially rectangular area determined using a screen forward range 352 and a screen depth 354. In particular, one side of the safe zone 350 may be an imaginary straight line extending from the vessel 310 (e.g., at the transducer array 320) to a point representing the screen forward range 352. Similarly, another side of the safe zone 350 may be an imaginary straight line extending from the vessel 310 (e.g., at the transducer array 320) to a point representing the screen depth 354. The remaining sides of the safe zone 350 may be formed by imaginary straight lines that extend from the points representing the screen forward range 352 and the screen depth 354, where the lines meet at point 356.

In some implementations, the alert zones discussed above may be in the form of geometric shapes other than a rectangle or those similar to a rectangle. In one implementation, the alert zones may be circular. For example, for a circular critical zone, the critical forward range and the critical depth may be in the form of polar coordinates. In another implementation, the alert zones may take a free form shape. For example, for a free form critical zone, the critical forward range and the critical depth may be designated using a free form input selection, where the free form input selection may be provided via a user interface of the one or more marine electronics device (e.g., user interface 240 of FIG. 2). In particular, the free form input selection may be provided via a touch screen. In yet another implementation, the free form alert zones may initially be in the form of geometric shapes (e.g., rectangle, circle, ellipse, and/or the like) that can be modified via a user interface of the one or more marine electronics device (e.g., user interface 240 of FIG. 2), such as through a touch screen.

Alerts

As noted above, if the one or more marine electronics devices determine that a portion of the depth line is positioned within an alert zone, then an alert may be provided to the operator of the vessel. As noted above, the depth line may be a representation of the depths of the surface of the underwater floor in the marine environment proximate to the vessel. Accordingly, such alerts may be used to avoid collisions with the underwater floor.

For example, using sonar data, the one or more marine electronics devices may determine the location of a depth line 360, as shown in FIG. 3A. As shown in FIG. 3A, the depth line 360 is positioned within the safe zone 350, but not in the critical zone 330 or the warning zone 340. As such, a risk of collision between the underwater floor and the vessel 310 may be relatively low. Accordingly, in such an example, the one or more marine electronics devices may not provide an alert to the operator of the vessel.

In another example, using sonar data, the one or more marine electronics devices may determine the location of a depth line 370, as shown in FIG. 3B. As shown in FIG. 3B, at least a portion of the depth line 370 is positioned within the warning zone 340, though no portions are positioned in the critical zone 330. As such, a risk of collision between the underwater floor and the vessel 310 may be relatively moderate. Accordingly, in such an example, the one or more marine electronics devices may provide an alert to the operator of the vessel that reflects the moderate risk.

In yet another example, using sonar data, the one or more marine electronics devices may determine the locations of a depth line 380, as shown in FIG. 3C. As shown in FIG. 3C, at least a portion of the depth line 380 is positioned within the critical zone 340, such that a risk of collision between the underwater floor and the vessel 310 may be relatively high. Accordingly, in such an example, the one or more marine electronics devices may provide an alert to the operator of the vessel that reflects the higher risk.

Figure 4:
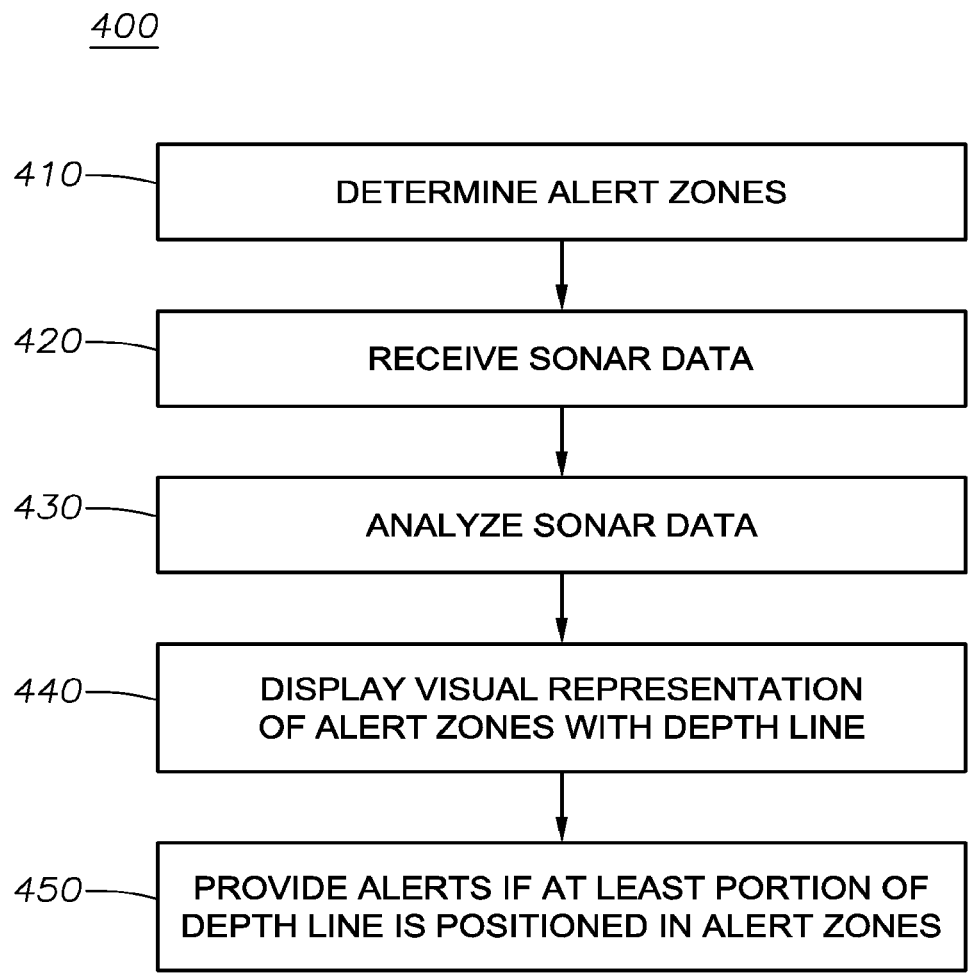
FIG. 4 illustrates a flow diagram of a method for providing one or more alerts based on one or more alert zones for a marine environment proximate to a vessel in accordance with implementations of various techniques described herein.

FIG. 4 illustrates a flow diagram of a method 400 for providing one or more alerts based on one or more alert zones for a marine environment proximate to a vessel in accordance with implementations of various techniques described herein. In one implementation, method 400 may be performed by a marine electronics device, such as a sonar module, an MFD device, a smart phone, and/or the like. As noted above, the marine electronics device may be positioned on and/or proximate to the vessel, and may be part of a sonar system. It should be understood that while method 400 indicates a particular order of execution of operations, in some implementations, certain portions of the operations might be executed in a different order. Further, in some implementations, additional operations or steps may be added to the method 400. Likewise, some operations or steps may be omitted. In some implementations, method 400 may be performed by multiple marine electronics devices. For example, method 400 may performed by a sonar module in conjunction with another marine electronics device, such as an MFD. Further, the method 400 may be performed in real-time or substantially near real-time on real-time or substantially near real-time sonar data.

At block 410, the marine electronics device may determine the one or more alert zones for the marine environment. As mentioned above, the marine electronics device may determine the one or more alert zones based on user inputs, which may be provided via a user interface of the marine electronics device (e.g., user interface 240 of FIG. 2).

As is also mentioned above, the one or more alert zones may include a critical zone, a warning zone, and/or a safe zone. In particular, the critical zone may be defined by a critical forward range and a critical depth, the values of which may be provided via the user inputs. The warning zone may be defined by a warning forward range and a warning depth, the values of which may be derived from the critical forward range and the critical depth, as discussed above. The safe zone may be defined by a screen forward range and a screen depth, the values of which may be provided via the user inputs, as discussed above. As is also mentioned above, a free form input selection may be provided by a user to determine a free form alert zone.

At block 420, the marine electronics device may receive sonar data from a transducer array disposed on and/or proximate to the vessel. The transducer array may be similar to those described above.

As noted above, the transducer array may receive sonar return signals that have reflected off of one or more objects in the marine environment (e.g., from in front of the vessel) and convert them into sonar data. An object may be a point on a surface of an underwater floor, a portion of a fish, a piece of debris, and/or any other waterborne object known to those skilled in the art. The marine electronics device may receive the sonar data, and may do so in real-time or substantially near real-time.

At block 430, the marine electronics device may analyze the sonar data received from the transducer array. In one implementation, the marine electronics device may analyze the sonar data to determine locations of the one or more objects within the marine environment. In particular, the marine electronics device may analyze the sonar data for each sonar return signal in order to determine a location for each object in the marine environment from which each sonar return signal is reflected. In another implementation, the sonar data may be analyzed in real-time or substantially near real-time as the vessel traverses through the marine environment.

In a further implementation, a depth line may be generated based on the determined locations of the one or more objects within the marine environment. As noted above, the depth line may be a representation of the depths of the surface of the underwater floor in the marine environment proximate to the vessel.

The depth line may be generated based on the determined locations (i.e., the analyzed sonar data) using any technique known to those skilled in the art. Implementations for generating a depth line based on analyzed sonar data are described in more detail in commonly assigned U.S. patent application Ser. No. 14/798,148, entitled DEPTH DISPLAY USING SONAR DATA, the entire disclosure of which is herein incorporated by reference. In one implementation of the incorporated disclosure, the depth line may be generated based on point cloud data. The point cloud data may be generated by plotting the locations of the one or more objects (as determined above) in a Cartesian plot (i.e., an x-y plot). The depth line may then be generated from the point cloud data using one or more image processing techniques. Once generated, the depth line may be displayed in place of at least a portion of the point cloud data in the Cartesian plot that was used to generate the depth line. In another implementation, the depth line may be displayed together with a remaining portion of the point cloud data in the Cartesian plot that was not used to generate the depth line.

At block 440, based on the analyzed sonar data, the marine electronics device may display a visual representation of the one or more alert zones in conjunction with the depth line (as determined in block 430). The marine electronics device may use a display element (e.g., the display element 230 of FIG. 2) to display the visual representation. In some implementations, block 440 may be optional.

In one implementation, the one or more alert zones may be displayed together with the depth line in the form of a depth display. The depth display may be defined as a visualization of the depths of the underwater floor and/or other objects of a marine environment proximate to a vessel. In particular, the depth display may include a visualization of the depth line and, in some implementations, may include a visualization of the remaining portion of the point cloud data mentioned above.

Figure 5:
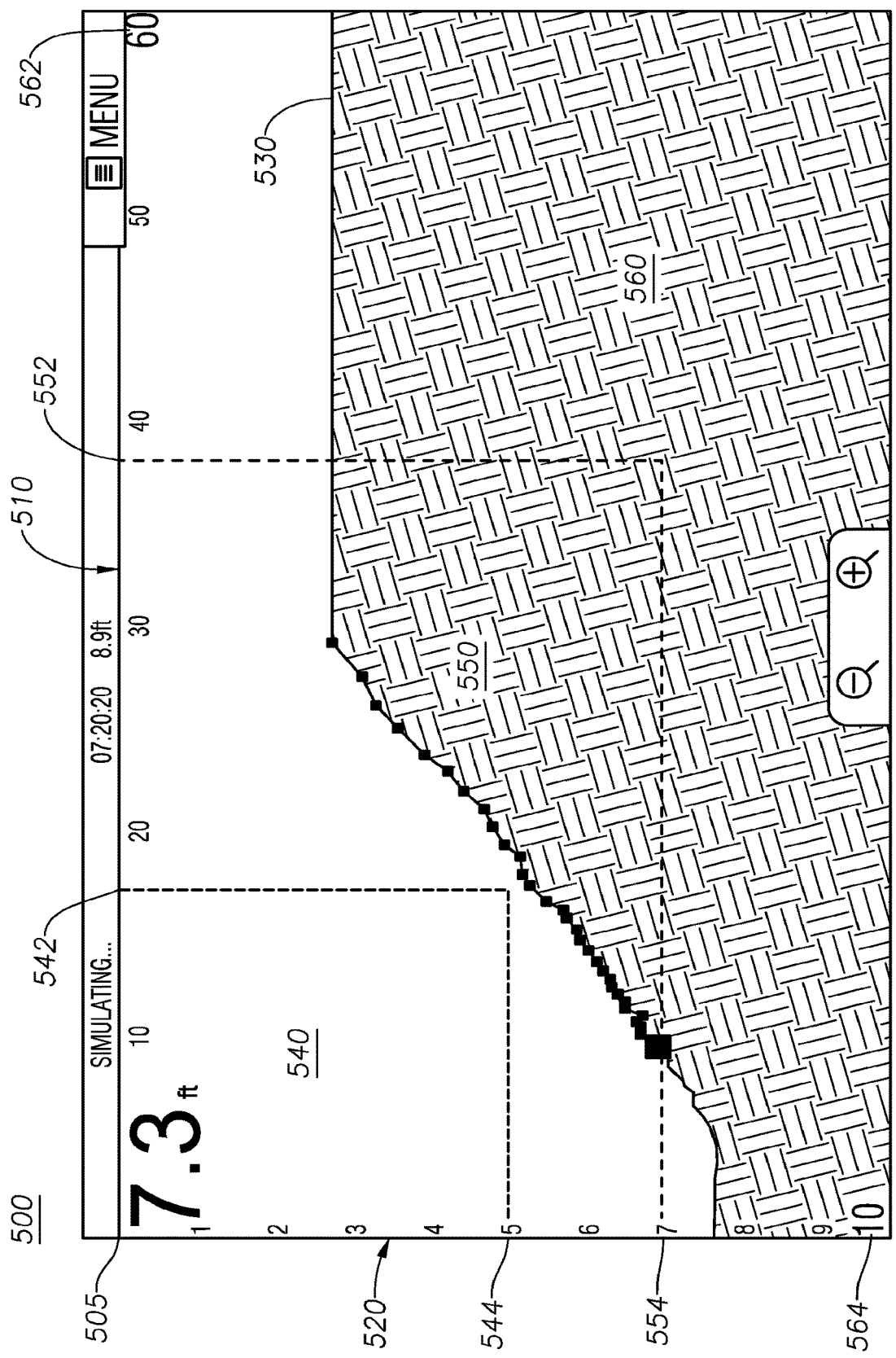
FIGS. 5-9 illustrate depth displays having alert zones in accordance with implementations of various techniques described herein.

In one example, FIG. 5 illustrates a depth display 500 having alert zones in accordance with implementations of various techniques described herein. The depth display 500 may be in the form of a Cartesian plot, in which locations of one or more objects in front of a vessel may be plotted with respect to a vessel. It should be noted that other implementations of the depth display 500 may include Cartesian plots which illustrate objects to the side of and/or behind the vessel.

A horizontal axis 510 (i.e., the x-axis) may be used to display a range of distances in front of or ahead of the vessel, and a vertical axis 520 (i.e., the y-axis) may be used to display a scale of depths of the marine environment below the vessel. The position of the vessel in the marine environment may be represented at the point 505 where the x-axis and the y-axis intersect. As shown, the portion of the depth display 500 that is to the right of the point 505 may represent the marine environment generally in front of the vessel. Accordingly, the range of distances along the horizontal axis 510 may increase in value in a rightward direction. Further, the scale of depths along the vertical axis 520 may increase in value in a downward direction.

The depth display 500 may include a depth line 530 plotted in the depth display 500. As mentioned above, the depth line 530 may be generated from analyzed sonar data that may represent the marine environment generally in front of the vessel.

The depth display 500 may further include a critical zone 540, a warning zone 550, and a safe zone 560, where each zone may be substantially rectangular. The critical zone 540 may be determined using a critical forward range 542 and a critical depth 544, as discussed above with respect to FIG. 3. As mentioned above, the critical forward range 542 and a critical depth 544 may be provided to the marine electronics device via user input. The warning zone 550 may be defined by a warning forward range 552 and a warning depth 554, which may be derived based on the critical forward range 542 and the critical depth 544, as discussed above. The safe zone 560 may be defined by a screen forward range 562 and a screen depth 564, as is also discussed above. Further, the screen forward range 562 and the screen depth 564 may be provided to the marine electronics device via user input.

As shown in FIG. 5, at least a portion of the depth line 530 is positioned in the warning zone 550, but not in the critical zone 540. As such, a risk of collision between the vessel and the underwater floor may be relatively moderate.

Figure 6:
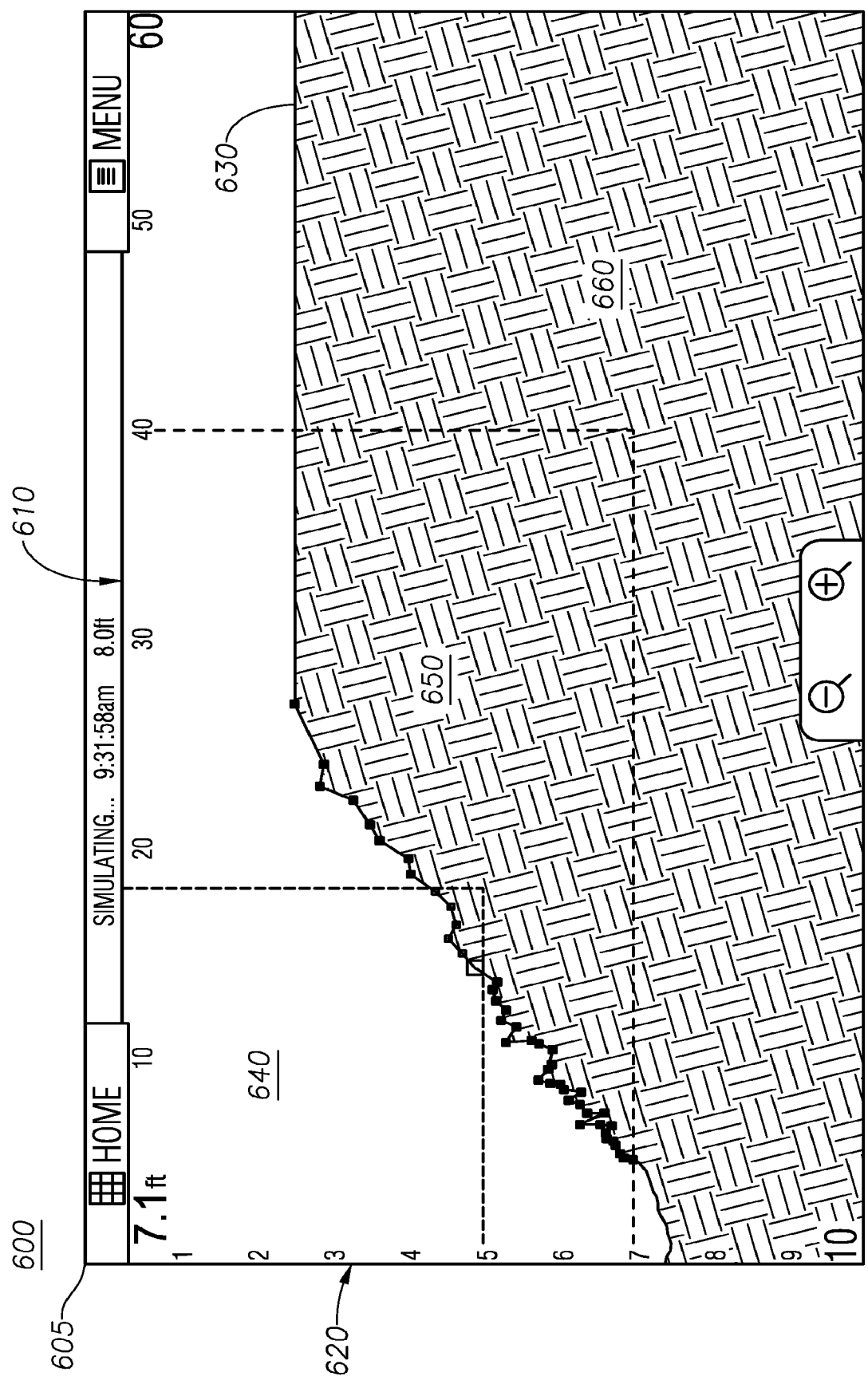

In another example, FIG. 6 illustrates a depth display 600 having alert zones in accordance with implementations of various techniques described herein. The point 605, horizontal axis 610, vertical axis 620, depth line 630, critical zone 640, warning zone 650, and safe zone 660 may be similar to those discussed above with respect to FIG. 5. As shown in FIG. 6, at least a portion of the depth line 630 is positioned in the critical zone 640. As such, a risk of collision between the vessel and the underwater floor may be relatively high.

Figure 7:
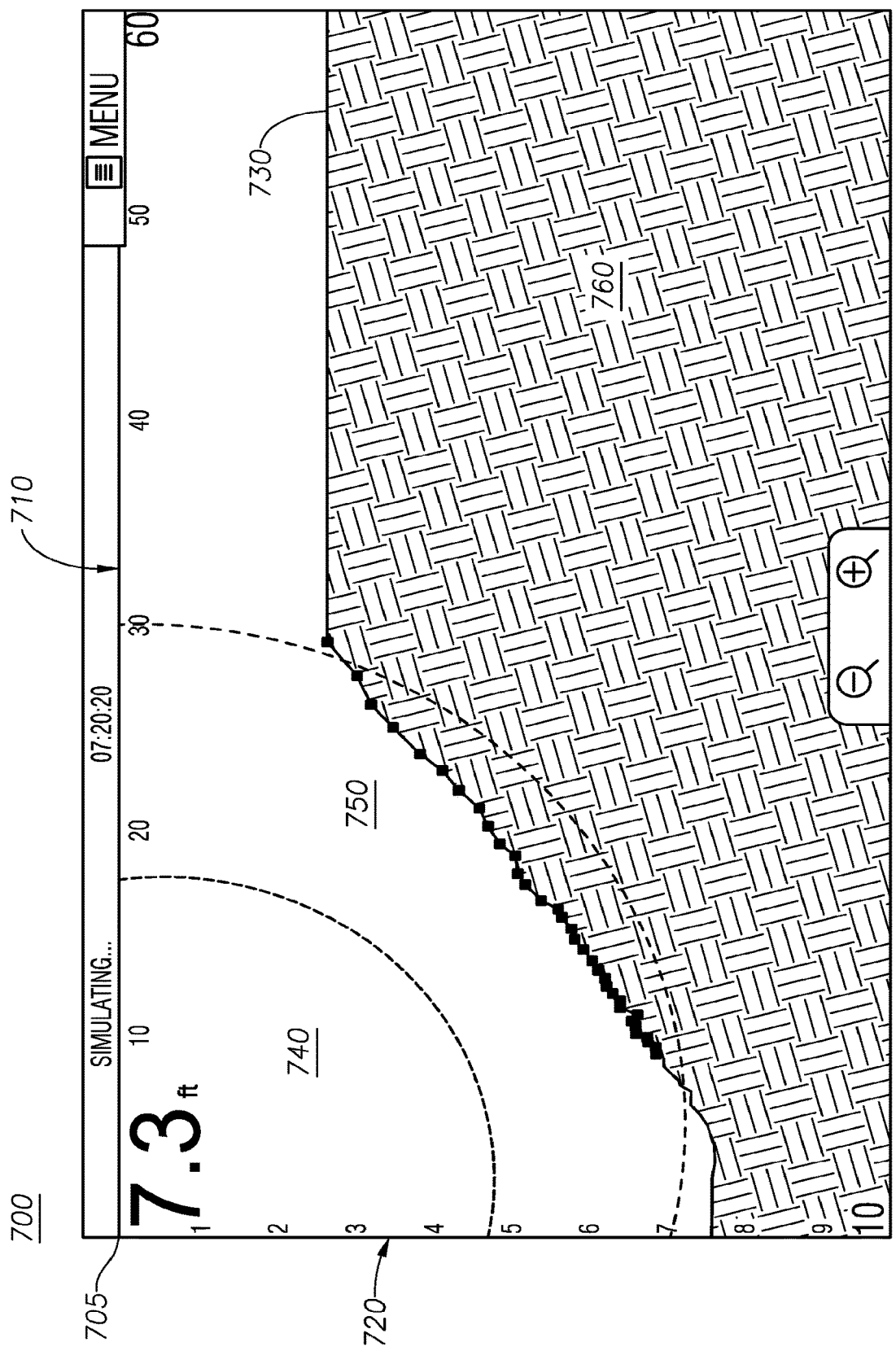

In yet another example, FIG. 7 illustrates a depth display 700 having alert zones in accordance with implementations of various techniques described herein. The point 705, horizontal axis 710, vertical axis 720, and depth line 730 may be similar to those discussed above with respect to FIG. 5. As shown in FIG. 7, the critical zone 740, warning zone 750, and safe zone 760 are circular. As mentioned above, such zones may be formed based on polar coordinates of a critical forward range and a critical depth, where such polar coordinates may be provided via user input.

Figure 8:
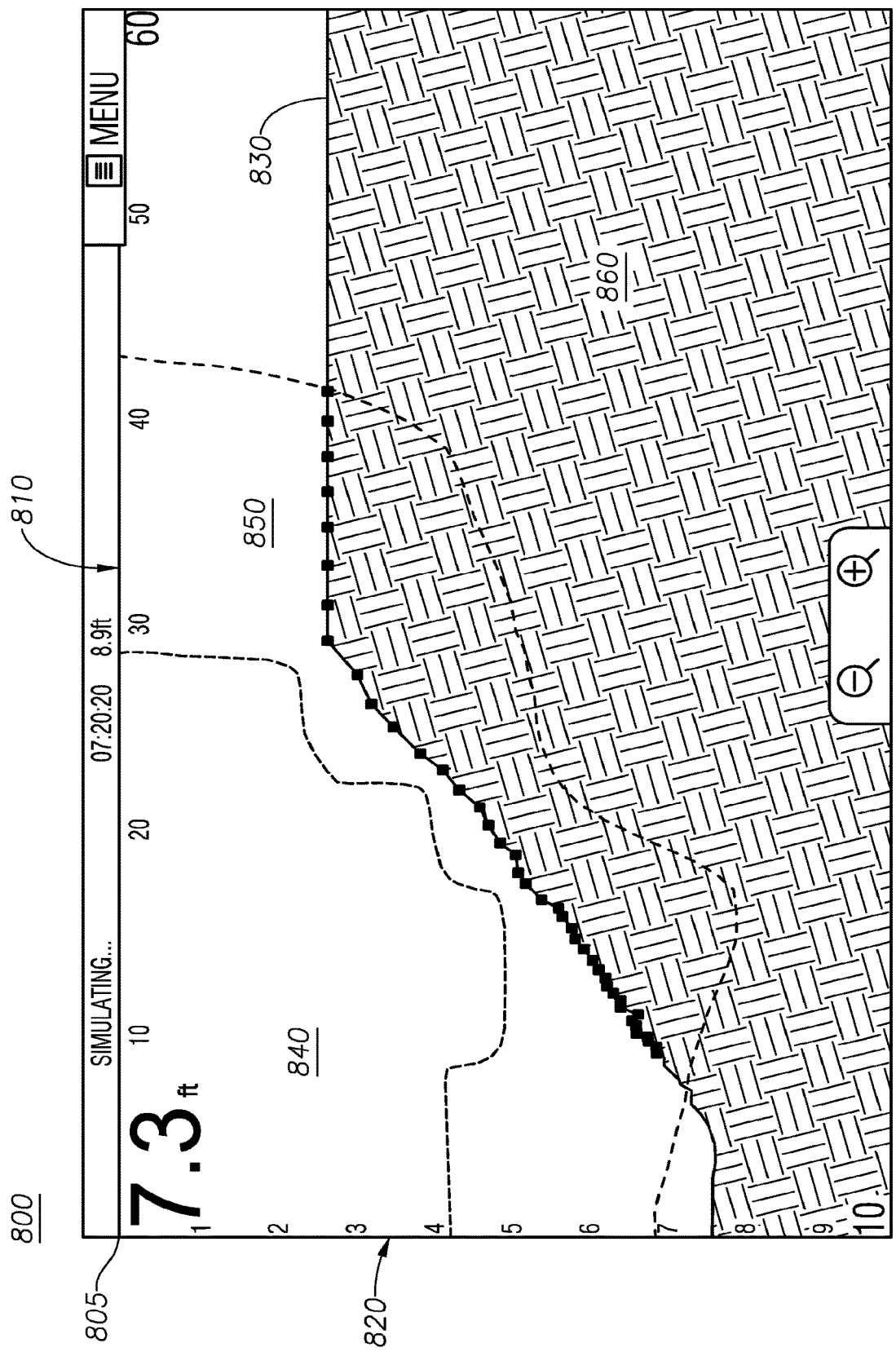

In yet another example, FIG. 8 illustrates a depth display 800 having alert zones in accordance with implementations of various techniques described herein. The point 805, horizontal axis 810, vertical axis 820, and depth line 830 may be similar to those discussed above with respect to FIG. 5. As shown in FIG. 8, the critical zone 840, warning zone 850, and safe zone 860 are in a free form shape. As mentioned above, in one implementation, such zones may be formed based on a critical forward range and a critical depth, where the critical forward range and the critical depth may be designated using a free form input selection. In another implementation, the free form alert zones may initially be in the form of geometric shapes (e.g., rectangle, circle, ellipse, and/or the like) that can be modified via a user interface.

Figure 9:
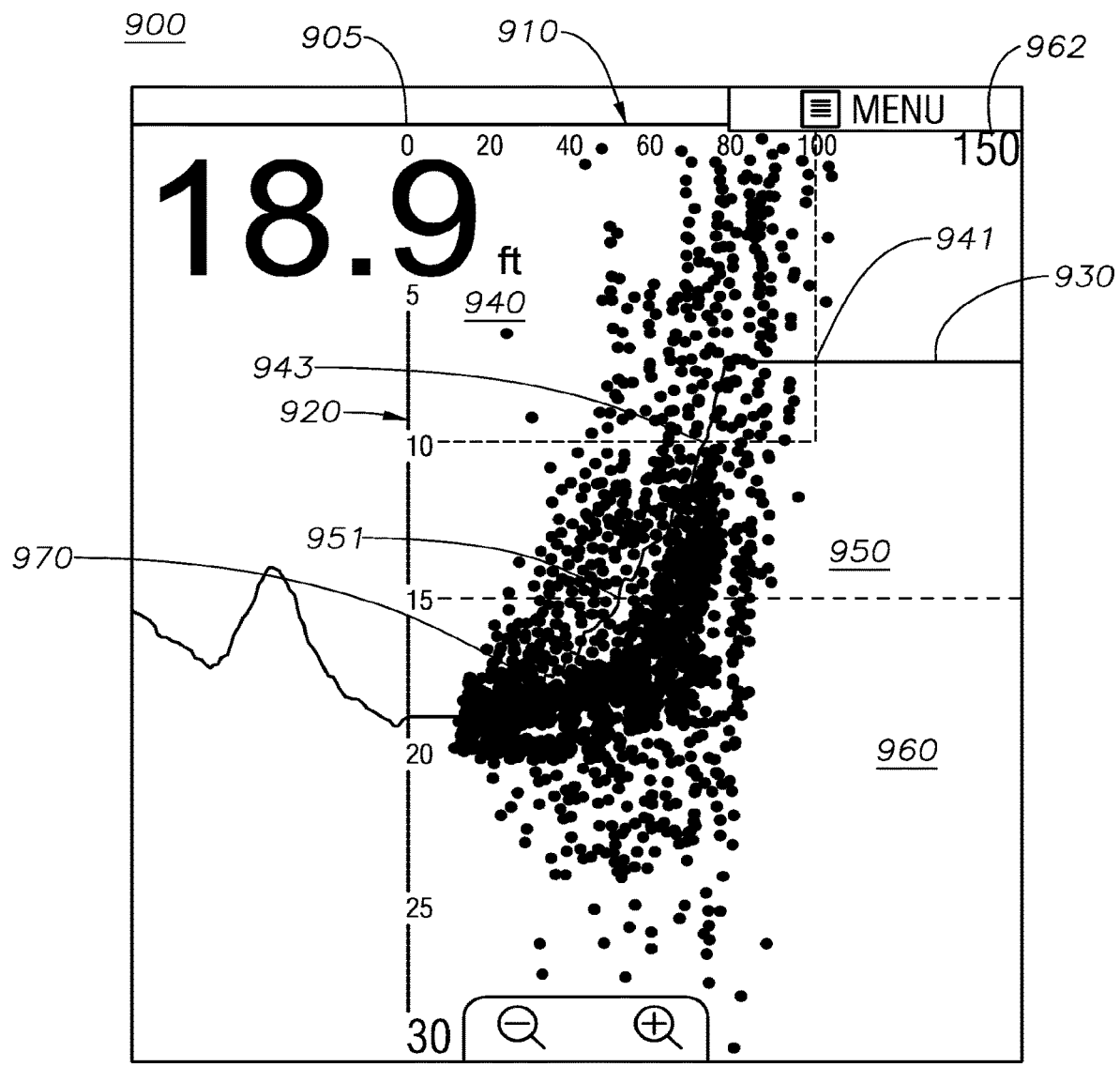

In yet another example, FIG. 9 illustrates a depth display 900 having alert zones in accordance with implementations of various techniques described herein. The point 905, horizontal axis 910, vertical axis 920, depth line 930, critical zone 940, warning zone 950, and safe zone 960 of the depth display 900 may be similar to those discussed above with respect to FIG. 5. As noted above, the position of the vessel in the marine environment may be represented at the point 905 where the x-axis and the y-axis intersect.

As shown in FIG. 9, at least a portion of the depth line 930 is positioned in the critical zone 940. As such, a risk of collision between the vessel and the underwater floor may be relatively high. In addition, the depth display 900 may also show point cloud data 970 that was not used to generate the depth line 930. As mentioned above, the point cloud data 970 may be generated by plotting the determined locations of the one or more objects in the marine environment (as determined at block 430). Accordingly, the point cloud data 970 may represent the locations of objects such as fish, debris, and/or any other waterborne objects known to those skilled in the art.

Returning to block 440 of FIG. 4, in another implementation, the marine electronics device may display a visual representation of the one or more alert zones together with the depth line in the form of a heading line extension on a navigation chart display.

The navigation chart display may be a map of the current location of the vessel. The navigation chart display may include a representation of the vessel, and may include other information, such as prior recorded depths, contours, navigational hazards, and/or any other information. The navigation chart display may also display a line in the direction of travel of the vessel. This line may hereinafter be referred to as the heading line extension. The heading line extension may be used to indicate the future location of the vessel if the vessel maintains a current course.

In one implementation, the heading line extension may be separated into one or more sections in order to visualize where portions of the depth line lie within the one or more alert zones. In particular, the sections may be used to visualize where the depth line intersects with the one or more alert zones. In a further implementation, each section may be represented by a different color.

Figure 10:
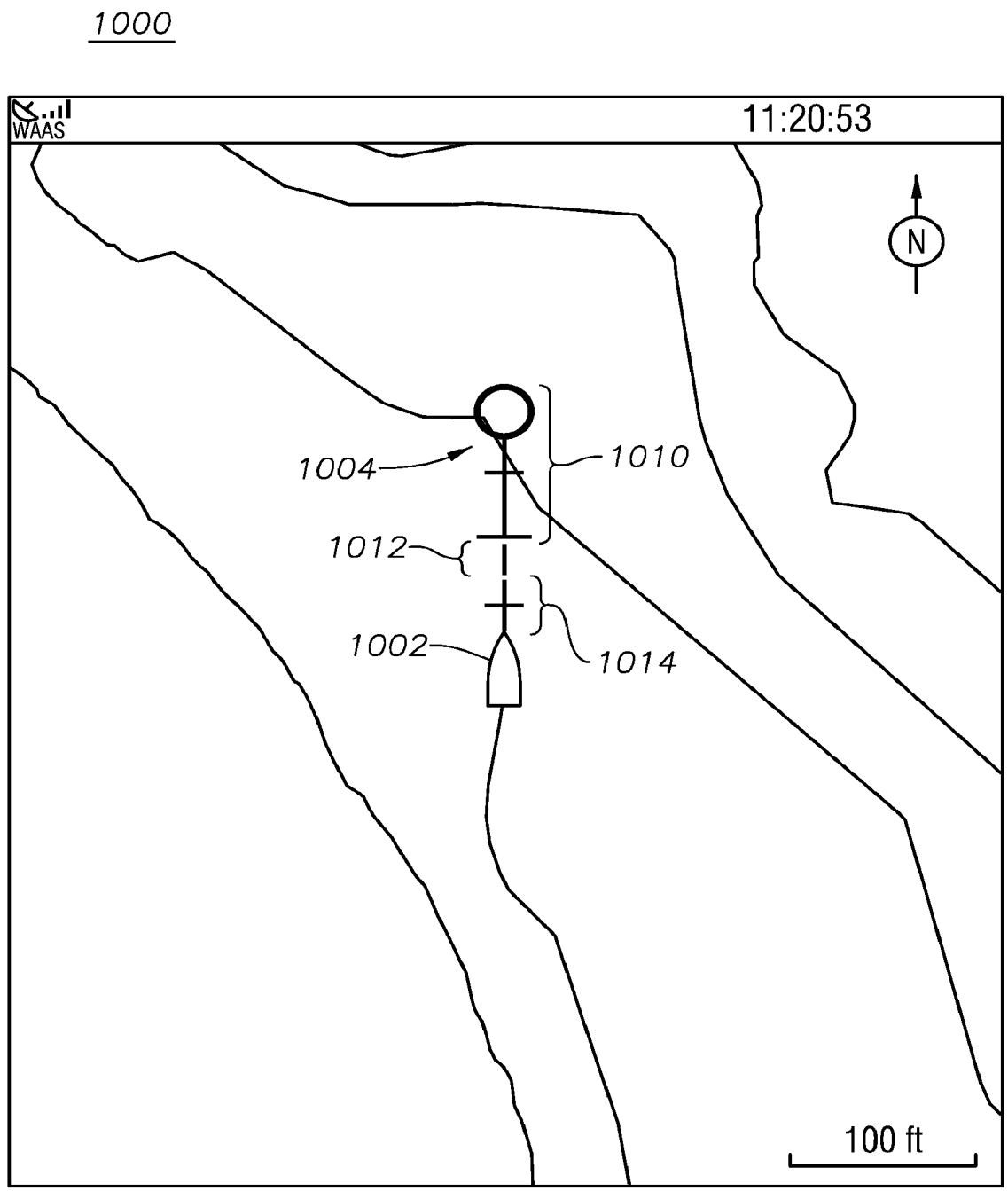
FIG. 10 illustrates a navigation chart display having alert zones in accordance with implementations of various techniques described herein.

For example, FIG. 10 illustrates a navigation chart display 1000 having alert zones in accordance with implementations of various techniques described herein. As shown, the navigation chart display 1000 may include a vessel representation 1002 and a heading line extension 1004. The heading line extension 1004 may extend from the vessel representation 1002 in order to indicate future locations of the vessel. Further, the data of the navigation chart display 1000 may correspond to the data of the depth display 900 of FIG. 9. In particular, the range of distance represented by the heading line extension 1004 may correspond to the screen forward range 962. As shown in FIG. 9, the screen forward range 962 may be approximately 150 feet (ft). Accordingly, the range of distance represented by the heading line extension 1004 may also be approximately 150 ft.

As is also shown in FIG. 9, a portion of the depth line 930 lies within the critical zone 940. In particular, the depth line 930 intersects the critical zone 940 at a point 943 having a range of approximately 70 ft and at a point 941 having a range of approximately 100 ft. As such, it can be determined that the underwater floor in the marine environment begins to reach the critical zone 940 at a range of approximately 70 ft in front of the vessel, and onward until at least a range of approximately 150 ft (the screen forward range 962).

Accordingly, the marine electronics device may generate the section 1010 on the heading line extension 1004 so that it represents the portions of the depth line 930 that lie within the critical zone 940 at ranges 70-150 ft in front of the vessel 1002. In one implementation, the section 1010 may be displayed as red to better visualize the portions of the depth line 930 within the critical zone 940. In another implementation, where the portions of the depth line intersect an alert zone at multiple points, the intersection point closest to the critical range point may be used to determine when the underwater floor begins to reach the alert zone.

Similarly, section 1012 on the heading line extension 1004 may be derived based on the warning zone 950. In particular, as shown in FIG. 9, the depth line 930 intersects the warning zone 950 at point 951 having a range of approximately 50 ft. As such, it can be determined that the underwater floor begins to reach the warning zone at a range of approximately 50 ft in front of the vessel, and onward until a range of approximately 70 ft (the beginning of the critical zone 940). Accordingly, the marine electronics device may generate the section 1012 on the heading line extension 1004 so that it represents ranges 50-70 ft in front of the vessel 1002. In one implementation, the section 1012 may be displayed as yellow to better visualize the portions of the depth line 1004 within the warning zone 950.

Section 1014 on the heading line extension 1004 may be derived based on the safe zone 960. In particular, as shown in FIG. 9, the depth line 930 may be positioned within the safe zone 960 between ranges of 0-50 ft in front of the vessel. As such, it can be determined that the underwater floor is positioned in the safe zone 960 at ranges of approximately 0-50 ft in front of the vessel. Accordingly, the marine electronics device may generate the section 1014 on the heading line extension 1004 so that it represents ranges 0-50 ft in front of the vessel 1002. In one implementation, the section 1014 may be displayed as green to better visualize the portions of the depth line 1004 within the safe zone 960.

Returning to FIG. 4, at block 450, the marine electronics device may provide one or more alerts if at least a portion of the depth line is positioned within the one or more alert zones. The marine electronics device may provide such alerts if the portions of the depth line are positioned within any of the alert zones, including the critical zone, the warning zone, and the safe zone.

In particular, such alerts may be provided if, for an upcoming course for the vessel, the portions of the depth line are positioned within at least the critical zone or the warning zone. In such instances, collisions between the vessel and the underwater floor may become likelier. In an implementation where the one or more alerts are provided, an autopilot may automatically be instructed to change course or stop the vessel in order to avoid such collisions.

Figure 11:
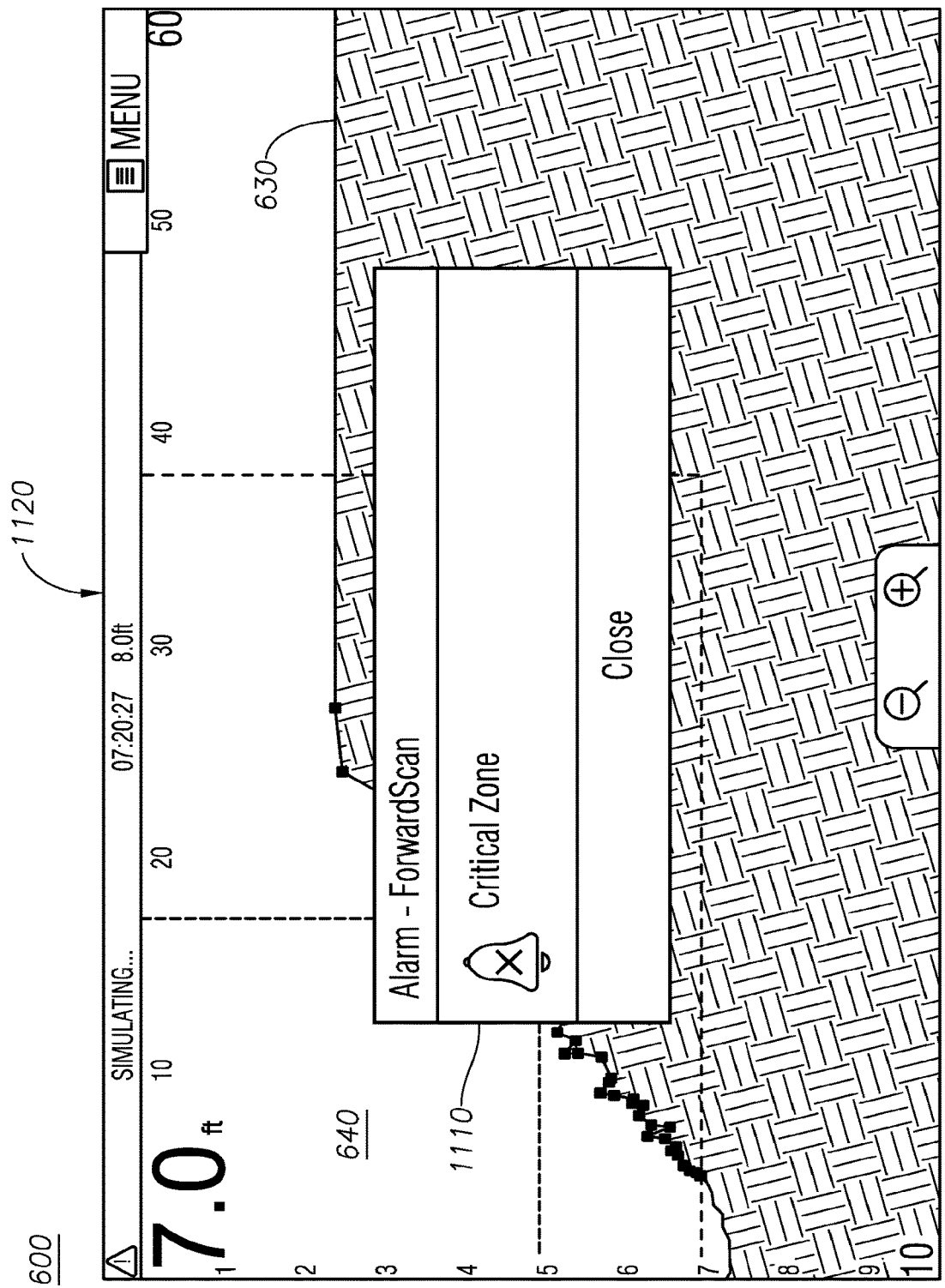
FIG. 11 illustrates a depth display in which alerts are provided in accordance with implementations of various techniques described herein.

The one or more alerts may be provided by the marine electronics device in any form known to those skilled in the art, including as one or more visual indicators on a display, one or more audio signals in the form of an alarm sound, and/or the like. For example, FIG. 11 illustrates the depth display 600 from FIG. 6 in accordance with implementations of various techniques described herein, where alerts are provided in the depth display 600. As noted above with respect to the depth display 600 of FIG. 6, at least a portion of the depth line 630 is positioned in the critical zone 640. Accordingly, an alert in the form of a pop-up box 1110 may be used, where the pop-up box 1110 may indicate that portions of the depth line 630 for an upcoming course are positioned within the critical zone 630. In addition, a flashing red bar 1120 positioned at the top of the display 600 may also be used.

In sum, implementations relating to alert zones for a marine environment, described above with respect to FIGS. 1-11, may help an operator of a vessel to identify and/or understand the depths of the underwater floor proximate to the vessel. In particular, the one or more alert zones, along with the use of the one or more alerts, may assist the operator identifying dangerously low depths of the underwater floor that may lie ahead.

Further implementations of a sonar system, including the sonar system 200 of FIG. 2, are discussed in greater detail below.

Transducer Array

In some implementations, referring back to FIG. 2, the transducer array 220 and/or sonar module 210 may be positioned within a housing. The housing may include a recessed portion defining a containment volume for holding the transducer elements. To prevent cavitation or the production of bubbles due to uneven flow over the housing, the housing (and in particular the containment volume portion of the housing) may have a gradual, rounded or otherwise streamlined profile to permit laminar flow of water over the housing. In some examples, an insulated cable may provide a conduit for wiring to couple each of the transducer elements to the sonar module 210. As detailed herein, any of a number of configurations of transducer elements and transducer arrays may be provided within the housing.

The shape of a transducer element may largely determine the type of beam that is formed when that transducer element transmits a sonar pulse (e.g., a circular transducer element emits a cone-shaped beam, a linear/rectangular transducer element emits a fan-shaped beam, etc.). In some implementations, a transducer element may comprise one or more transducer elements positioned to form one transducer element. For example, a rectangular transducer element may comprise two or more rectangular transducer elements aligned with each other so as to be collinear. In some implementations, three transducer elements aligned in a collinear fashion (e.g., end to end) may define one rectangular transducer element.

Likewise, transducer elements may comprise different types of materials that cause different sonar pulse properties upon transmission. For example, the type of material may determine the strength of the sonar pulse. Additionally, the type of material may affect the sonar returns received by the transducer element. As such, implementations described herein are not meant to limit the shape or material of the transducer elements.

In some implementations, each of the transducer elements may be a rectangular transducer element. Thus, for example, each of the transducer elements may be substantially rectangular in shape and made from a piezoelectric material such as a piezoelectric ceramic material, as is well known in the art. In such a regard, the transducer elements may be configured to transmit and/or receive a fan-shaped beam (e.g., 15° by 90°, though any fan shaped beam is contemplated).

As noted above, any of the transducer elements described herein may be configured to transmit and receive sonar pulses (e.g., transmit/receive transducer elements). While the transducer elements may be described herein as transmit/receive transducer elements, in some implementations, the transducer elements may be configured as receive-only transducer elements, or in other cases, transmit-only transducer elements.

In some implementations, each transducer element may be configured to operate at any frequency, including operation over an array of frequencies. Along these lines, it should be understood that many different operating ranges could be provided with corresponding different transducer element sizes and shapes (and corresponding different beamwidth characteristics). Moreover, in some cases, the sonar module 210 may include a variable frequency selector, to enable an operator to select a particular frequency of choice for the current operating conditions.

The active element in a given transducer may comprise at least one crystal. Wires may be soldered to coatings so that the crystal can be attached to a cable which transfers the electrical energy from the transmitter to the crystal. As an example, when the frequency of the electrical signal is the same as the mechanical resonant frequency of the crystal, the crystal may move, creating sound waves at that frequency. The shape of the crystal may determine both its resonant frequency and shape and angle of the emanated sound beam. Frequencies used by sonar devices vary, but may range from 50 KHz to over 900 KHz depending on application. Some sonar systems may vary the frequency within each sonar pulse using "chirp" technology. These frequencies may be in the ultrasonic sound spectrum and thus inaudible to humans.

It should be noted that although the widths of various beams are described herein, the widths being referred may not correspond to actual edges defining limits to where energy is placed in the water. As such, although beam patterns and projections of beam patterns are generally described herein as having fixed and geometrically shaped and sharply defined boundaries, those boundaries merely correspond to the −3 dB (or half power) points for the transmitted beams. In other words, energy measured outside of the boundaries described is less than half of the energy transmitted, but this sound energy is present nonetheless.

Thus, some of the boundaries described are merely theoretical half power point boundaries.

Marine Electronics Device

In some implementations, again referring to FIG. 2, the display element 230, the user interface 240, and/or the sonar module 210 may be configured to communicate with one another via a network 218 and/or the network hub 216. The network 218 and/or the network hub 216 may be implemented using any wired and/or wireless technology known to those skilled in the art, including, but not limited to, Ethernet, the National Marine Electronics Association (NMEA) framework, Bluetooth, Wi-Fi, LAN, WLAN, cellular, and/or any other network implementation. In some implementations, the display element 230, the user interface 240, and/or the sonar module 210 may be configured to communicate with one another directly without the use of the network 218 or the network hub 216. The display element 230, the sonar module 210, and/or the user interface 240 may be part of a single device, such that at least two of those components are located in a single housing. The network hub 216 may include one or more interface ports to allow components, such as the display element 230 or the user interface 240, to communicate with the network 218. In one implementation, the network hub 216 may be configured to allow for plug-and-play communication with the display element 230 and/or the user interface 240.

The display element 230 may be configured to display images, where it may receive processed sonar data from the sonar signal processor 214 and render the data into one or more windows on the display element 230. For example, the display element 230 may include a liquid crystal display (LCD) screen, a touch screen display, or any other implementation known to those skilled in the art. In one implementation, the display element 230 may include two or more displays.

A user may interact with the sonar system 200 through the user interface 240. The user interface 240 may include, for example, a keyboard, keypad, function keys, mouse, scrolling device, input/output ports, touch screen, or any other user interface known to those skilled in the art. In one implementation, the user interface 240 may be integrated into the display element 230.

The sonar signal processor 214 may be any device or circuitry operating in accordance with hardware and/or software which configures the device or circuitry to perform the corresponding functions of the sonar signal processor 214 as described herein. In some implementations, the sonar signal processor 214 may include a processor, a processing element, a coprocessor, a controller, an application specific integrated circuit (ASIC), a field programmable gate array (FPGA), a hardware accelerator, or any other implementation known to those skilled in the art, where the sonar signal processor 214 is configured to execute various programmed operations or instructions stored in a memory device. The sonar signal processor 214 may further include multiple compatible additional hardware and/or software items configured to: (i) implement signal processing or enhancement features to improve display characteristics, data, and/or images, (ii) collect or process additional data, such as time, temperature, global positioning system (GPS) information, and/or waypoint designations, or (iii) filter extraneous data to better analyze the collected data. The sonar signal processor 214 may further implement notices and alarms, such as those determined or adjusted by a user, to reflect depth, presence of fish, and/or proximity of other watercraft. Still further, the sonar signal processor 214, in combination with suitable memory, may store incoming data from the transducer array 220, screen images for future playback, transfer and/or alter images with additional processing to implement zoom or lateral movement, or correlate data such as fish or bottom features to a GPS position or temperature.

The sonar module 210 may include standard elements and/or components, including memory (e.g., non-transitory computer-readable storage medium), at least one database, power, peripherals, and various other computing elements and/or components that may not be specifically shown in FIG. 2. The user interface 240 may be used to receive one or more preferences from a user of the display element 230 for managing or utilizing the sonar system 200, including interfacing with the transducer array 220. Further, the user may set up desired behavior of the sonar module 210 and/or transducer array 220 via user-selected preferences using the user interface 240. For example, as mentioned above, the sonar module 210 may be configured to transmit one or more transmit signals to the transducer array 220, such that, in response, the transducer array 220 produces one or more sonar output signals. Various elements and/or components of the system 200 that may be useful for the purpose of implementing method 300 (see FIG. 3) may be added, included, and/or interchanged, in manner as described herein.

Using the transceiver 212, various types of data including sonar data may be communicated, transmitted, and/or relayed between the sonar module 210 and the transducer 220. In another implementation, the sonar module 210 may interface and communicate with the transducer array 220 via wired and/or wireless connections known to those skilled in the art.

The sonar module 210 may include computer-executable instructions related to a storage handler or software module configured to automatically record the sonar data in memory (e.g., a database) upon receiving the sonar data from the transducer 220. In some examples, recording the sonar data generated by the transducer 220 may include logging the sonar data generated by the transducer 220 and the geographical coordinate data (i.e., GPS data) associated with the transducer 220. In some examples, the storage handler may be configured to automatically upload the sonar data and/or the GPS data to at least one database via a network, such as, e.g., a remote server database (e.g., a cloud based server) via a communication network (e.g., a cloud based network), including a wireless communication network.

A data manager of the sonar module 210 may include computer-executable instructions related to a display handler or software module configured to display images associated with the sonar data, e.g., to a user via the display element 230. The display handler may be configured to generate image data associated with the sonar data and further display images generated from the image data and sonar data to a user via a display. The display handler may be configured to display images associated with a map to the user based on the sonar data and the geographical coordinate data (i.e., GPS data).

Figure 12:
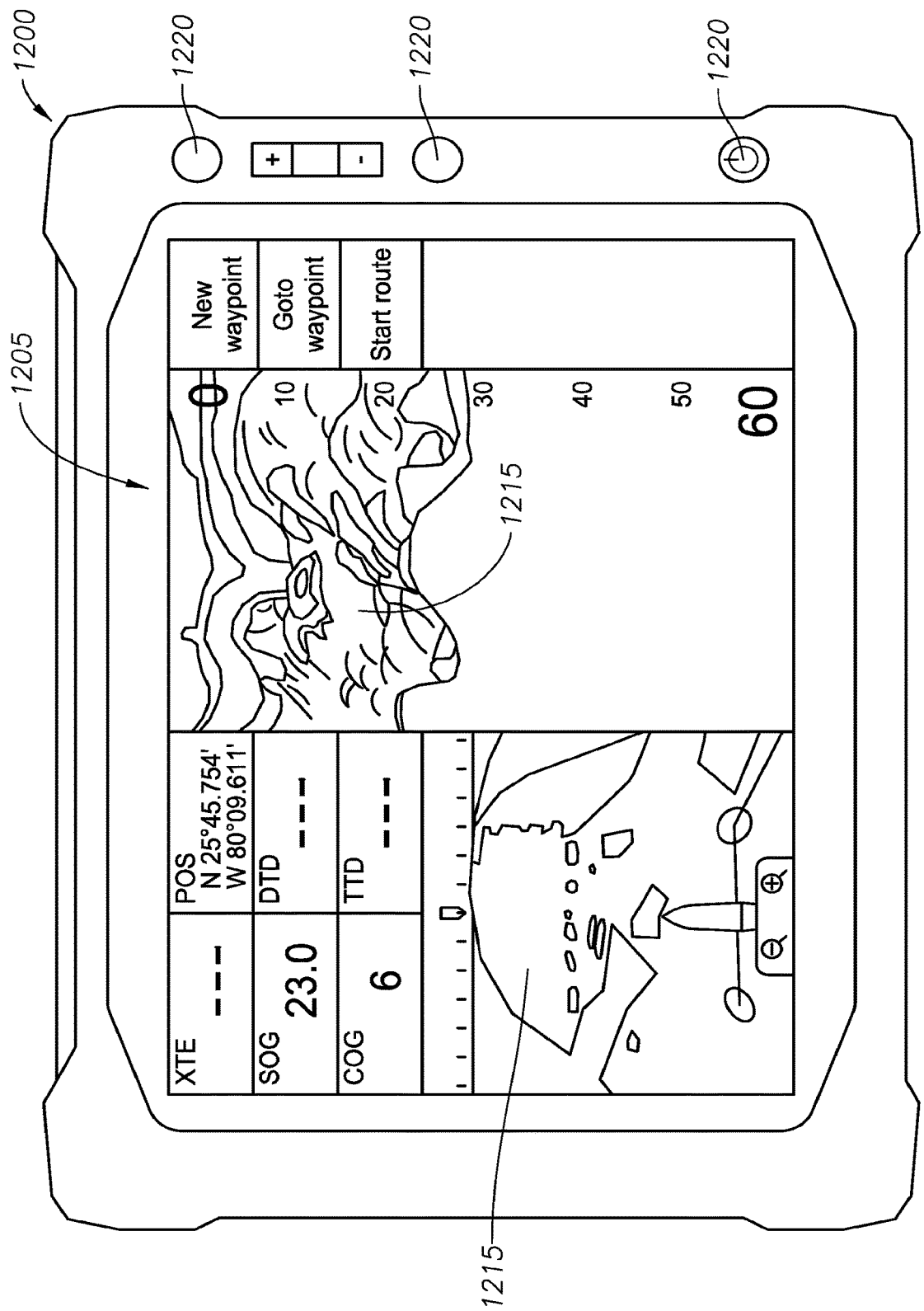
FIG. 12 illustrates an example schematic of a marine electronics device in accordance with implementations of various techniques described herein.

FIG. 12 illustrates an example schematic of a marine electronics device 1200 in accordance with implementations of various techniques described herein. The marine electronics device 1200 may be in the form of an MFD device.

The MFD device 1200 includes a screen 1205. In certain implementations, the screen 1205 may be sensitive to touching by a finger. In other implementations, the screen 1205 may be sensitive to the body heat from the finger, a stylus, or responsive to a mouse. The marine electronics device 1200 may be attached to a NMEA bus or network. The MFD device 1200 may send or receive data to or from another device attached to the NMEA 2000 bus. For example, the MFD device 1200 may transmits commands and receive data from a motor or a sensor using an NMEA 2000 bus. In one implementation, the MFD device 1200 may be capable of steering a vessel and controlling the speed of the vessel, i.e., autopilot. For example, one or more waypoints may be input to the marine electronics device 1200, and the MFD device 1200 may steer a vessel to the one or more waypoints. The MFD device 1200 may transmit or receive NMEA 2000 compliant messages, messages in a proprietary format that do not interfere with NMEA 2000 compliant messages or devices, or messages in any other format. The device 1200 may display marine electronic data 1215. The marine electronic data types 1215 may include chart data, radar data, sonar data, steering data, dashboard data, navigation data, fishing data, engine data, and the like. The MFD device 1200 may also include a plurality of buttons 1220, which may be either physical buttons or virtual buttons, or a combination thereof. The MFD device 1200 may receive input through a screen 1205 sensitive to touch or buttons 1220.

As mentioned above, a marine electronics device may be used to record and process sonar data. The marine electronics device may be operational with numerous general purpose or special purpose computing system environments or configurations. The marine electronics device may include any type of electrical and/or electronics device capable of processing data and information via a computing system. In one implementation, the marine electronics device may be a marine instrument, such that the marine electronics device may use the computing system to display and/or process the one or more types of marine electronics data.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. The computing systems may be configured to operate using various radio frequency technologies and implementations, such as sonar, radar, GPS, and like technologies.

The various technologies described herein may also be implemented in distributed computing environments where tasks are performed by remote processing devices that are linked through a communications network, e.g., by hard-wired links, wireless links, or combinations thereof. In a distributed computing environment, program modules may be located in both local and remote computer storage media including memory storage devices.

The discussion of the present disclosure is directed to certain specific implementations. It should be understood that the discussion of the present disclosure is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of the implementations and combinations of elements of different implementations within the scope of the claims. It should be appreciated that in the development of any such implementation, as in any engineering or design project, numerous implementation-specific decisions should be made to achieve a developers' specific goals, such as compliance with system-related and business related constraints, which may vary from one implementation to another. Moreover, it should be appreciated that such a development effort maybe complex and time consuming, but would nevertheless be a routine undertaking of design, fabrication, and manufacture for those of ordinary skill having benefit of this disclosure. Nothing in this application should be considered critical or essential to the claimed subject matter unless explicitly indicated as being "critical" or "essential."

Reference has been made in detail to various implementations, examples of which are illustrated in the accompanying drawings and figures. In the following detailed description, numerous specific details are set forth to provide a thorough understanding of the present disclosure. However, the present disclosure may be practiced without these specific details. In other instances, well-known methods, procedures, components, circuits and networks have not been described in detail so as not to unnecessarily obscure aspects of the embodiments.

It should also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations and is not intended to limit the present disclosure. As used in the description of the present disclosure and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A marine electronics device comprising:
   a processor; and
   a memory comprising a plurality of program instructions which, when executed by the processor, cause the processor to:
   determine one or more alert zones for a marine environment proximate to a vessel, wherein each of the one or more alert zones is an area extending forward and down from the vessel, wherein the area is formed using polar coordinates based on at least one of an alert depth or an alert forward range;
   receive sonar data from a transducer assembly disposed on the vessel, wherein the sonar data corresponds to the marine environment;
   analyze the received sonar data to determine a depth line, wherein the depth line is a representation of one or more depths of an underwater floor of the marine environment; and
   provide one or more alerts if at least a portion of the depth line is positioned within the one or more alert zones.

2. The marine electronics device of claim 1, wherein the one or more alert zones is an at least partially circular area extending forward and down from the vessel.

3. The marine electronics device of claim 1, wherein values for the alert forward range or the alert depth are based on one or more user inputs.

4. The marine electronics device of claim 1, wherein the area is formed based on a first imaginary line extending forward of the vessel to the alert forward range, a second imaginary line extending downward of the vessel to the alert depth, and an imaginary curved line extending between a first imaginary point corresponding to the alert forward range and a second imaginary point corresponding to the alert depth.

5. The marine electronics device of claim 1, wherein the one or more alert zones comprise at least one of a critical zone and a warning zone.

6. The marine electronics device of claim 5, wherein the critical zone is formed based on at least one of a critical forward range or a critical depth, and wherein warning zone is formed based on at least one of a warning forward range or a warning depth.

7. The marine electronics device of claim 6, wherein a value for the warning forward range is based on a ratio of the critical forward range, and wherein a value for the warning depth is based on a ratio of the critical depth.

8. The marine electronics device of claim 6, wherein an edge of the critical zone is closer to the vessel than an edge of the warning zone.

9. The marine electronics device of claim 6, wherein the one or more alert zones further comprise a safe zone that is formed based on at least one of a screen forward range or a screen depth.

10. The marine electronics device of claim 9, wherein the screen forward range is a range of the marine environment that is displayed by the marine electronics device and the screen depth is a depth of the marine environment that is displayed by the marine electronics device, and wherein values for the screen forward range and the screen depth are based on one or more user inputs.

11. The marine electronics device of claim 6, wherein the program instructions which, when executed by the sonar signal processor, cause the processor to provide the one or more alerts further comprise program instructions which, when executed by the sonar signal processor, cause the processor to provide the one or more alerts if at least a portion of the depth line is positioned within the critical zone or the warning zone.

12. The marine electronics device of claim 1, wherein the one or more alerts comprise one or more visual indicators on a display, one or more audio signals in the form of an alarm sound, or combinations thereof.

13. The marine electronics device of claim 1, wherein the program instructions further cause the processor to display a visual representation of the one or more alert zones in conjunction with the depth line.

14. The marine electronics device of claim 13, wherein the visual representation comprises a depth display, wherein the depth display provides a representation of the one or more alert zones, the depth line, and depths of one or more objects of the marine environment.

15. The marine electronics device of claim 13, wherein the visual representation comprises a heading line extension on a navigation chart display, wherein the heading line extension is a line indicating one or more future locations of the vessel if the vessel maintains a current course, and wherein the heading line extension is separated into one or more sections in order to represent where the depth line is positioned within the one or more alert zones.

16. A sonar system comprising:
    a transducer assembly configured to receive one or more sonar return signals and to convert the one or more sonar return signals into sonar data;
    a marine electronics device comprising:
       a processor;
       a memory comprising a plurality of program instructions which, when executed by the processor, cause the processor to:
       determine one or more alert zones for a marine environment proximate to a vessel, wherein each of the one or more alert zones is an area extending forward and down from the vessel, wherein the area is formed using polar coordinates based on at least one of an alert depth or an alert forward range;

receive sonar data from the transducer assembly, wherein the sonar data corresponds to the marine environment;

analyze the received sonar data to determine a depth line, wherein the depth line is a representation of one or more depths of an underwater floor of the marine environment; and provide one or more alerts if at least a portion of the depth line is positioned within the one or more alert zones.

17. The sonar system of claim 16, wherein the area is formed based on a first imaginary line extending forward of the vessel to the alert forward range, a second imaginary line extending downward of the vessel to the alert depth, and an imaginary curved line extending between a first imaginary point corresponding to the alert forward range and a second imaginary point corresponding to the alert depth.

18. A marine electronics device, comprising:

a processor; and a memory comprising a plurality of program instructions which, when executed by the processor, cause the processor to:

determine one or more alert zones for a marine environment proximate to a vessel, wherein each of the one or more alert zones is an area extending forward and down from the vessel, wherein the area is formed into a free form shape that is based on one or more free form input selections;

receive sonar data from a transducer assembly disposed on the vessel, wherein the sonar data corresponds to the marine environment;

analyze the received sonar data to determine a depth line, wherein the depth line is a representation of one or more depths of an underwater floor of the marine environment; and provide one or more alerts if at least a portion of the depth line is positioned within the one or more alert zones.

19. The marine electronics device of claim 18, wherein the one or more free form input selections are based on user input provided to a touch screen of the marine electronics device.

20. The marine electronics device of claim 18, wherein the one or more free from input selections correspond to one or more modifications to a pre-formed geometric shape.

* * * * *